Oct. 24, 1944.  J. K. SIMPSON  2,361,130

CONTROLLING SYSTEM OPERATED BY FLUID PRESSURE

Filed July 7, 1941  2 Sheets—Sheet 1

Inventor
John Keith Simpson
By M. W. McConkey
Attorney

Oct. 24, 1944.    J. K. SIMPSON    2,361,130
CONTROLLING SYSTEM OPERATED BY FLUID PRESSURE
Filed July 7, 1941    2 Sheets-Sheet 2

Inventor
John Keith Simpson
By M. W. McCaskey
Attorney

Patented Oct. 24, 1944

2,361,130

UNITED STATES PATENT OFFICE 2,361,130

CONTROLLING SYSTEM OPERATED BY FLUID PRESSURE

John Keith Simpson, Leamington Spa, England, assignor to Automotive Products Company Limited, Leamington Spa, England Application July 7, 1941, Serial No. 401,370
In Great Britain July 10, 1940

7 Claims. (Cl. 121—41)

This invention relates to controlling systems operated by fluid pressure and it has for its primary object to provide a simple yet efficient form of controlling system utilising a valve of the follow-up or hunting type so as to produce a servo action by using pressure fluid from a convenient source.

As a further object the invention sets out to provide an extremely compact form of servo unit which is adapted to be operated in conjunction with the customary liquid pressure remote control system of an aircraft and which is useful for working the engine throttles and other devices of a similar nature in which power assistance is desirable.

According to the invention there is provided for a fluid pressure remote control system, a motor unit fed with pressure fluid by way of a valve having a follow-up action arranged to bring the movable member of the motor unit to a position corresponding with that occupied by a valve actuating member, characterised by the fact that the motor unit is permanently urged in one direction by a force produced by the pressure fluid from the supply, and the setting of said motor unit is altered by presenting in opposition to said force, a fluid force which is greater or less than said force, depending upon the direction in which the motor unit is to be actuated.

In a motor cylinder unit operating in conjunction with a follow-up valve, said motor cylinder unit being arranged so that its piston element automatically assumes a position corresponding to that of a valve actuating member, according to a feature of the invention the piston element of the motor cylinder unit has on its two sides, working spaces of unequal effective cross-sectional area, the smaller of which spaces is permanently connected with the fluid pressure supply, while the larger is connected with the follow-up valve so that when the valve and motor unit are in equilibrium said larger space is sealed, but movement of the valve to change the setting of the motor piston causes said valve to connect said larger space, either to the supply or to an outlet, depending upon the direction of the desired piston movement. Conveniently the motor unit comprises a pair of cylinders each having its own piston, said pistons being operatively connected together and being urged in one direction by fluid pressure acting in one only of the cylinders, and in the opposite direction by pressure fluid acting in both cylinders simultaneously.

Further, in a motor cylinder unit the double-acting piston element of which is mechanically connected with a control valve of the follow-up type and with a valve actuating member, according to the invention the area of the piston element upon which fluid acts to move said piston element in one direction is greater than the corresponding opposing area of the piston element, the working space within which fluid acts upon said opposing area being in permanent communication with the supply of pressure fluid, the valve device being arranged to seal the other working space (i. e. that having the greater operative area) when the motor unit is in equilibrium, and to place said other space in communication with the pressure supply or with the exhaust when the piston element is required to move in one direction or the other. The piston element may comprise a pair of pistons mounted upon a common piston rod but sliding in individual cylinder spaces, those working spaces at corresponding ends of the two cylinders being connected together and being fed in common through the control valve, and one of the remaining spaces being in permanent communication with the pressure fluid, while the other is open to the atmosphere. The cylinders may be coaxially arranged, the pistons being carried upon a single piston rod, the latter conveniently being hollow so that its interior serves to connect together those two working spaces within which fluid acts simultaneously in the same direction upon the pistons.

In an alternative arrangement the motor cylinder has a piston rod of substantial diameter extending through only one end of the cylinder, thus producing a surrounding annular working space which has a smaller cross-sectional area than the working space at the opposite side of the piston, said annular working space being in permanent communication with the supply.

The valve which controls the flow of fluid to and from the working space, having the larger operative cross-sectional area, may conveniently comprise a primary valve member which is connected operatively with the valve actuating member and which seats upon, and is adapted to move a secondary valve member, the latter having engagement with a fixed seating. The valve may be urged towards its "off" position by fluid pressure which is substantially proportional to the effective force on the piston element, whereby the operator, in actuating the valve, "feels" the force which is being exerted upon the piston by the working fluid.

The invention is illustrated by way of example in the accompanying diagrammatic drawings, in which.

Figure 1:
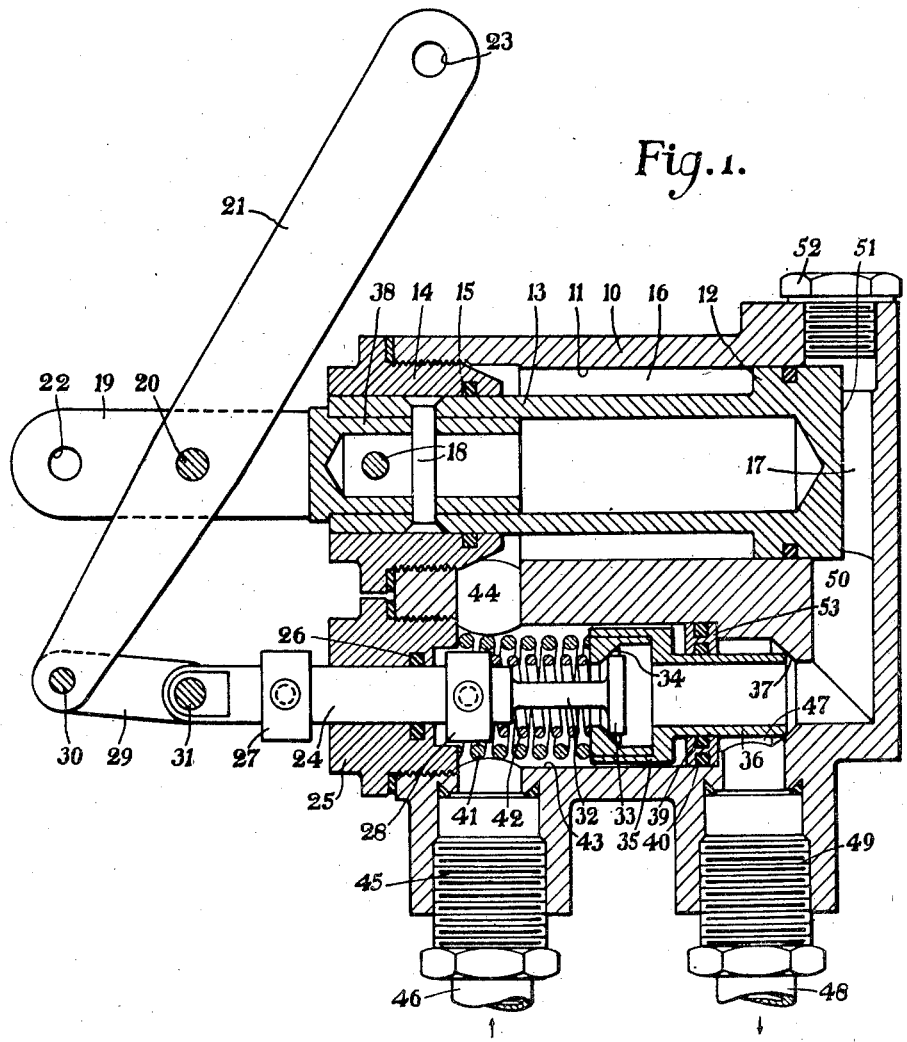
Figure 1 is a sectional elevation of one form of combined motor unit and valve device.

The combined motor cylinder and control valve unit shown in Figure 1 comprises a body 10, which is formed with a cylinder bore 11 containing an axially slidable piston 12, the latter being double-acting and being formed upon the end of a tubular piston rod 13. This piston rod passes slidably through a plug 14, which constitutes one end of the cylinder and which is fitted with a packing ring 15. The outside diameter of the piston rod 13 is conveniently such that the effective cross-sectional area of the surrounding annular working space 16 is substantially one-half of that of the working space 17 at the opposite side of the piston 12, which space 17 extends for the full cross-sectional area of the cylinder bore 11. A plug member 38 is fitted within the end of the piston rod 13 by means of a pair of pins 18 and it is bifurcated at its outer part, one of the limbs being indicated at 19. A pin 20 serves as a pivotal attachment between a floating lever 21 and the piston rod 13, while the limbs 19 are drilled at 22 for the attachment of the mechanism or other device which requires to be actuated by the motor cylinder unit. The upper end of the floating lever 21 is also drilled at 23 for connection to an operating lever (not shown) or other suitable valve controlling means.

The body 10 accommodates a control valve device comprising a rod 24 which is slidably mounted in a plug member 25 and is surrounded by a packing ring 26, axial movement of said rod being limited by a pair of collars 27 and 28. The free end of the rod 24 is connected with the lower end of the floating lever 21 by a pair of twin links, one of which is indicated at 29, these both being pivoted at 30 and 31. The opposite end of the rod 24 is shaped to form a stem 32 which has a mushroom head 33, and constitutes the primary valve member. The relatively sharp periphery of the "underneath" of the head 33 is arranged to engage with a frusto-conical seating 34 formed within a hollow, substantially cylindrical head 35 carried by a tubular stem 36. The head 35 and stem 36 together constitute a secondary valve member, and extremity of said stem 36 is also relatively sharp and is adapted to engage with a frusto-conical seating 37 formed within the body 10. Also the stem 36 fits slidably within an annular guide member 53, which latter has internal and external packing rings 39 and 40 respectively to prevent leakage of liquid from one side of the guide member to the other. The secondary valve member 35, 36 is urged towards its closed position by a coiled compression spring 41 acting between the plug member 25 and the head 35, while a second coiled compression spring 42 acts between the head 35 and the collar 28 so as to keep the head 33 in engagement with its seating 34.

A bore 43 formed in the body 10 to accommodate the primary and secondary valve members, with their springs 42 and 41 respectively, is in permanent communication with the annular working space 16 by means of a passage 44, and also with an inlet connection 45 for the attachment of a pipe 46 leading to a supply of pressure liquid such as a pump or hydraulic accumulator (not shown). The annular space 47 between the guide member 38 and the seating 37 of the secondary valve member communicates with an exhaust pipe 48 conveniently leading to a reservoir (not shown) for spare liquid, the pipe 48 being attached to the body 10 by means of a connection 49. The aperture in the seating 37 leads upwards through a passage 50 to the right-hand working space 17 of the cylinder bore 11, so that pressure liquid disposed within the passage 50 acts upon the completely circular surface 51 of the piston 12. The upper end of the passage 50 is closed by a plug member 52.

In Figure 1 the control valve device is shown in its normal position of equilibrium, the secondary valve member 35, 36 and the primary valve member 32, 33 both being closed. Thus the passage 50 and the working space at the right-hand end of the cylinder bore 11 are sealed, whereas the annular space 16 is, as above mentioned, in permanent communication with the supply of pressure liquid through the pipe 46.

Figures 2, 3:
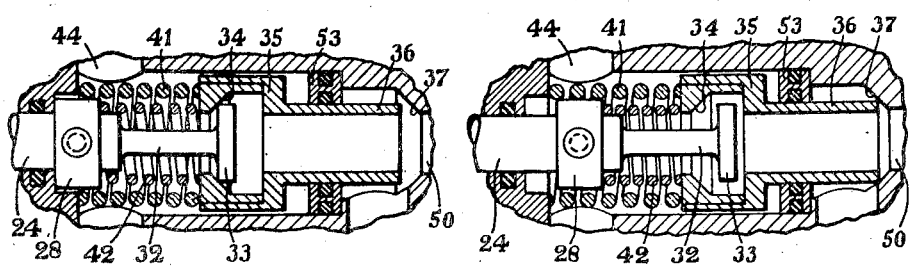
Figures 2 and 3 are fragmentary sectional elevations showing different operative positions of the control valve device.

If it is desired to move the piston 12 to the left the upper end of the floating lever 21 is moved to the left; owing to the natural resistance to movement of the piston rod 13 and the device which is coupled thereto and requires operating, the pin 20 acts as a fulcrum for the lever 21, and consequently the rod 24 is moved to the right. This shifts the head 33 from its seating 34 as shown in Figure 2, so that pressure liquid from the pipe 46 can flow through the secondary valve member 35, 36 and through the passage 50 to act upon the surface 51 of the piston 12. Under these conditions the piston 12 has the liquid at supply pressure acting in opposite directions upon its two faces, but as the surface 51 is twice as large as the cross-sectional area of the annular working space 16, the piston 12 is urged towards the left by a force equal to that produced by the full supply pressure acting upon half the area of the surface 51. The liquid rejected from the annular space 16 is free to pass to the opposite side of the piston by way of the valve device and the passage 50. As the piston 12 moves along the bore 11 is displaces the pin 20 of the lever 21, and the latter, in moving angularly about the axis of the hole 23, has its lower end shifted to the left, thus progressively reclosing the primary valve member 32, 33.

On the other hand, when the upper end of the lever 21 is moved to the right so as to bring about a corresponding movement of the piston 12, the rod 24 becomes shifted to the left so that the head 33, being in engagement with the seating 34, pulls the secondary valve 35, 36 away from the seating 37, as shown in Figure 3, thus placing the passage 50 into communication with the exhaust pipe 48. As the annular working space 16 is in communication with the supply pressure, the piston 12 is moved to the right with a force which is again equal to that produced by the supply pressure acting upon half the cross-sectional area of the bore 11. During this movement of the piston 12 to the right the rod 24 similarly moves to the right, thus restoring the stem 36 of the secondary valve member to its seating 37 as the desired setting of the piston 12 is reached. As a consequence the right-hand working space and the passage 50 again become sealed, and the supply pressure acting within the annular working space 16 causes the liquid in the sealed passage 50 to have its pressure increased until it becomes substantially one-half of the supply pressure, this of course being due to the fact that the area of the surface 51 of the piston 12 is twice the cross-sectional area of the annular working space 16.

Thus the lever 21, operatively connecting the actuating means with the piston rod 13 of the motor cylinder unit as well as with the control valve device, causes the latter to act in the manner of a valve of the hunting or follow-up type, whereby the position of equilibrium which is assumed by the piston 12 depends upon the position to which the upper end of the lever 21 is moved.

The control valve device shown in Figure 1 is designed so that its proper operation is unaffected by variations in the value of the supply pressure, and so that the fluid pressure which is effectively acting upon the piston 12 is also tending to reclose the valve device, thus enabling the operator to "feel" how the motor cylinder unit is working and to judge the resistance which is being encountered by the piston 12. For this purpose the diameter of the piston head 33 is made equal to the outside diameter of the tubular stem 36, and each of these areas is equal to twice the cross-sectional area of the rod 24. Thus, when the control valve is in the position shown in Figure 1, the primary valve member 32, 33 is balanced as far as the liquid pressure is concerned, for it has only half supply pressure acting upon the whole of the right-hand surface of its head, whereas the full supply pressure which is acting in opposition thereto is exerted upon an area equal to only half that of the head 33. The secondary valve member 35, 36 is likewise completely balanced with respect to the liquid pressure, this secondary valve member being in equilibrium with respect to the full supply pressure within the bore 43, and also with respect to the half supply pressure which is present within the passage 50 and the interior of said secondary valve member. When the head 33 of the primary valve member leaves its seating 34, as shown in Figure 2, so as to move the piston 12 to the left, said head 33 is then completely surrounded by liquid at supply pressure, with the result that there is a force developed on said primary valve member acting towards the left, which force is proportional to that acting upon the piston 12, for it is represented by the full supply pressure acting over an area equal to one-half the area of the head 33. Similarly when the secondary valve member 35, 36 is opened, as in Figure 3, the one-half supply pressure which was previously acting upon the primary valve head 33 is removed, with the result that the secondary valve member tends to be moved back to its closed position by a force again equal to the full supply pressure acting upon an area equal to half the area of the stem 36, i. e. half the area of the head 33. Thus with the piston rod 13 one-half the area of the piston 12, the force exerted upon the latter by liquid having a given supply pressure is the same for movement in both directions, and a similar proportional reaction is imparted to the rod 24.

Figure 4:
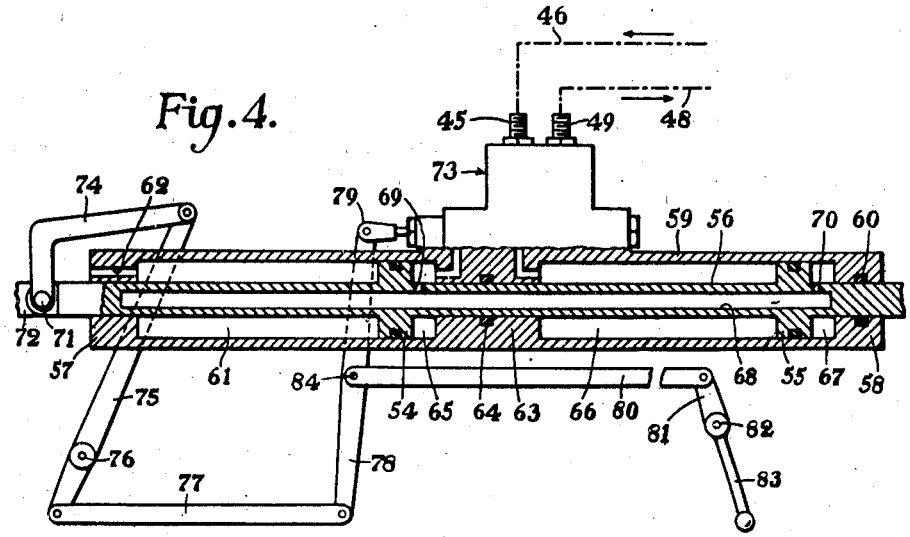
Figure 4 is a sectional elevation showing a modified arrangement.
Figure 5:
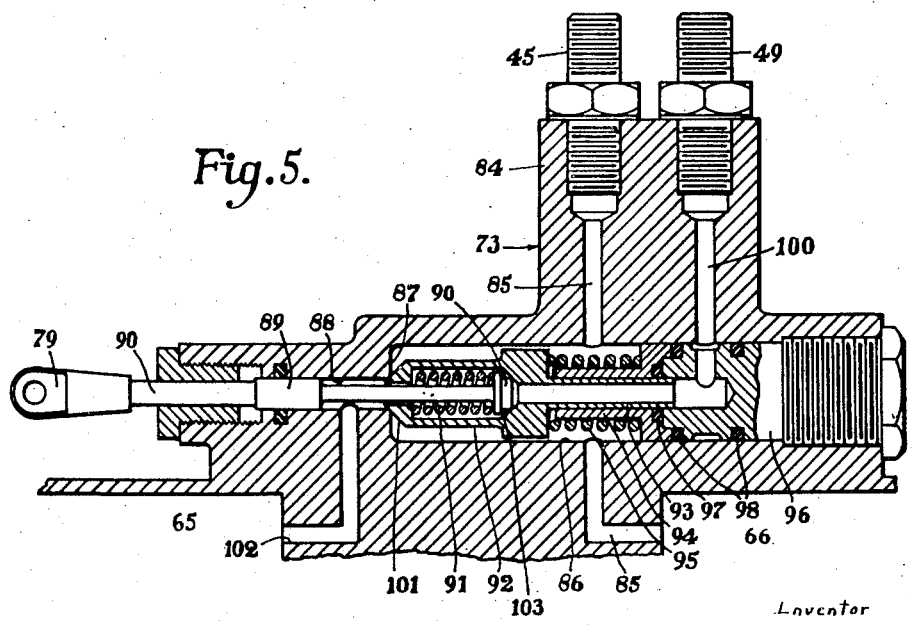
Figure 5 is a sectional elevation through the control valve device of Figure 4 drawn to an enlarged scale.

Another form of motor cylinder unit and control valve device is shown in Figures 4 and 5, and in this case the difference in the effective areas of the working spaces in the motor cylinder unit is obtained by having two pistons. These are indicated at 54 and 55 and they are carried by a common piston rod 56 extending through both end walls 57 and 58 of the cylinder, the latter being indicated at 59. The end wall 58 is provided with a packing 60 to prevent leakage of fluid from the adjacent working space 67, but the end wall 57 needs no packing, for the adjacent cylinder space 61 is open to the atmosphere through a passage 62. The cylinder 59 is provided intermediate its length with a fixed partition 63 through which the piston rod 56 passes slidably, a packing 64 being arranged to prevent leakage between the adjoining working spaces 65 and 66. The piston rod is formed with an axial cavity 68, which, by means of holes 69 and 70, forms a permanent connection between the working spaces 65 and 67.

The piston rod 56 is connected at 71 with the member to be operated, as shown at 72, and it is also connected with a control valve device indicated generally at 73. For this purpose, a link 74 connects the piston rod 56 with the upper end of a lever 75, which is pivotally anchored at 76 and has its lower end connected by a link 77 with the lower end of a floating lever 78. The upper end of the latter is connected with a bifurcated fitting 79 arranged to actuate the control valve device 73 as will be hereinafter explained. A link 80 connects the middle point 84 of the floating lever 78 with an actuating lever 81, which latter is pivoted at 82 and has an operating handle 83. This linkage is intended to produce a hunting or follow-up effect in the action of the control valve 73, and is merely indicated diagrammatically in Figure 4, as various other mechanisms are equally applicable. When the handle 83 is moved, the link 80 deflects the floating lever angularly about its lower end, thus causing the control valve device 73 to bring about movement of the piston rod 56, and this, through the medium of the link 73, lever 75 and link 77, restores the control valve device to its inoperative position as the piston rod assumes the position corresponding to that of the handle 83.

The construction of the control valve device is shown in Figure 5, and it comprises a body 84 having an inlet connection 45 for pressure liquid, and an exhaust connection 49. The inlet connection 45 is in permanent communication with the working space 66 by way of a passage 85, so that the supply pressure is always acting upon the left hand surface of the piston 55. Intersecting the passage 85 is a bore 86 having a shoulder 87 where it leads into a smaller, coaxial bore 88. The latter contains a slidable rod 89 which passes through a plug 90 and has the fitting 79 secured to its extremity. The opposite end of the rod 89 is reduced to form a stem having at its end a head 90 which is flanged to engage a coiled compression spring 91. The headed rod 89, 90 constitutes the primary valve member, the spring 91, as well as the head 90, being disposed within the hollow head portion 92 of a secondary valve member having a tubular stem 93. This is slidably mounted in a sleeve member 94 which is held by a coiled compression spring 95 in permanent engagement with a screw-threaded plug 96 closing the end of the bore 86. A packing ring 97 prevents leakage of liquid past the outside of the sleeve 93, and a pair of rings 98 seal the plug 96 in the bore 86. A passage 100 leads from the connection 49, through the plug 96, and thence to the interior of the secondary valve member 92, 93. The spring 95, which is stronger than the spring 91, urges the hollow head 92 to the left, so that its frustoconical end 101 engages normally with the relatively sharp edge of the shoulder 87, thus isolating from the pressure supply passage 85, the bore 88 and a passage 102 leading therefrom to the working spaces 66 and 67. The head 90 of the primary valve member has a relatively sharp edge arranged to engage a frusto-conical seating 103 under the action of the spring 91, and it will be seen that this engagement isolates the working spaces 66 and 67 from the exhaust passage 100.

The action of the control valve and motor unit shown in Figures 4 and 5 is as follows. When the rod 89 is in its neutral position, as in Figure 5, the working spaces 66 and 67 are sealed, for they are neither in communication with the pressure passage 85, nor the exhaust passage 100. Therefore, the pressure liquid from the supply acts within the working space 66, and, in pressing upon the piston 55, causes said piston and also the piston 54 to raise the pressure of the trapped liquid in the working spaces 66 and 67, a state of equilibrium being reached when the pressure in said spaces 66 and 67 reaches a value substantially half that of the supply. To bring about movement of the piston rod 56 to the left, the rod 89 is slid to the right (by the action of the handle 83 and associated mechanism as previously described) and this causes the head 90 to displace the secondary valve member 92, 93 to the right, thus allowing liquid at full supply pressure to enter the working spaces 66 and 67 by way of the passage 102. The effective piston area upon which this acts, namely the right-hand surfaces of both pistons 54 and 55, is, of course, twice the area of the left-hand surface of the piston 55 which is subject permanently to the supply pressure, so that the piston rod 56 moves to the left until such time as the control valve reverts to its "off" position. Similarly, when the rod 89 is pulled out, the head 90 leaves the seating 103, enabling liquid to escape from the working spaces 65 and 67 to the exhaust passage 100, as the pressure liquid within the working space 66 urges the pistons 54 and 55, with their piston rod 56, towards the right. With the pistons 54 and 55 arranged to have equal effective cross-sectional areas, the effort produced is the same for both directions of operation, although this is, of course, not an essential condition for the working of the device, for the effort in one direction may be made greater than that in the other by having the pistons 54 and 55 of different sizes.

As before, the control valve device is arranged to be unaffected by changes in the supply pressure, but in this case the valve is balanced in itself instead of being balanced only in conjunction with the reduced liquid pressure produced in the sealed working space of the motor unit when the latter is inoperative, as in the previous example. The seating diameter of the head 92 upon the end of the bore 88 is arranged to be equal to the outside diameter of the tubular stem 93, so that the secondary valve member 92, 93 is balanced with respect to the supply pressure when the valve device is "off" as shown in Figure 5. At the same time the reduced liquid pressure in the working spaces 65 and 67 present within the head 92 has no tendency to change the position of the parts, for the seating diameter of the head 90 is the same as that of the rod 89. When the head 92 of the auxiliary valve member leaves the shoulder 87, the interior of said head 92 becomes filled with liquid at supply pressure, and the same completely balanced state exists.

Likewise, when the head 90 of the primary valve member leaves its seating, pressure within the head 103 becomes substantially zero, but the secondary valve member remains in balance. The arrangement shown in Figures 4 and 5 has the particular advantages that it is simple and compact.

The constructions described are of course given by way of example only, and various modifications may be made in the construction and arrangement of the parts. If desired air or other gas may be used as the working fluid, but liquid is preferable in order to secure accurate working.

What I claim is:

1. In combination with a source of fluid under pressure and a member responsive to fluid pressure having a given area subjected at all times to the pressure of fluid from the source and a larger opposed area subjected to varying fluid pressure, a valve casing having an inlet connected to said source and an exhaust port, a plurality of poppet valve elements controlling the varying fluid pressure acting on the larger area of the pressure responsive member and each resisting continuing movement in a valve opening direction in proportion to the pressure differential existing across the pressure responsive member, said plurality of poppet valve elements comprising a primary valve member adapted to be manually controlled and a secondary valve member floating with respect to the manually operable control member, said secondary valve member having a part adapted to seat against the valve casing to cut off the exhaust port from the large area side of the pressure responsive member and having a passage therethrough with a seating at one end of the passage, and said primary valve member having a part equal in cross sectional area to the seating part of the secondary valve member and adapted to contact against the seating provided by the secondary valve member to thereby cut off the inlet port from the large area of the fluid pressure responsive member and to also exert a force therethrough to move the secondary valve member and having a manually operable stem of a cross sectional area bearing the same ratio to the cross sectional area of the seating parts of the primary and secondary valve members as the smaller area of the fluid pressure responsive member bears to the larger area thereof.

2. In combination with a source of fluid under pressure and a member responsive to fluid pressure having a given area subjected at all times to the pressure of fluid from the source and a larger opposed area twice as large as the smaller area and subjected to varying fluid pressure, a valve casing having an inlet connected to said source and an exhaust port, a plurality of poppet valve elements controlling the varying fluid pressure acting on the larger area of the pressure responsive member and each resisting continuing movement in a valve opening direction in proportion to the pressure differential existing across the pressure responsive member, said plurality of poppet valve elements comprising a primary valve member adapted to be manually controlled and a secondary valve member floating with respect to the manually operable control member, said secondary valve member having a part adapted to seat against the valve casing to cut off the exhaust port from the large area side of the pressure responsive member and having a passage therethrough with a seating at one end of the passage, and said primary valve member having a part equal in cross sectional area to the seating part of the secondary valve member and adapted to contact against the seating provided by the secondary valve member to thereby cut off the inlet port from the large area of the fluid pressure responsive member and to also exert a force therethrough to move the secondary valve member and having a manually operable stem of a cross sectional area half as large as the area of the seating parts of the primary and secondary valve members.

3. In combination with a motor having a pressure responsive member with opposed pressure responsive areas one of said areas being subjected at all times to a given unit pressure and the other area being larger than the first and being subjected to fluid pressures of varying unit values, a valve casing having an inlet and an exhaust port, a single three-way poppet type valve which controls the varying fluid pressure acting on the larger area of the pressure responsive member, and which exerts a reaction against actuating movement proportional to the effective pressure tending to move the pressure responsive member in one direction or the other, and a manually operable member pivotally connected to the valve and to the pressure responsive member so that movements of the pressure responsive member occasioned by manipulating the valve to vary the fluid pressure acting on the larger area of the pressure responsive member tend to return the valve to its initial position, said three-way poppet valve comprising a primary valve member adapted to be manually controlled and a secondary valve member floating with respect to the manually operable control member, said secondary valve member having a part adapted to seat against the valve casing to cut off the exhaust port from the large area side of the pressure responsive member and having a passage therethrough with a seating at one end of the passage, and said primary valve member having a part equal in cross sectional area to the seating part of the secondary valve member and adapted to contact against the seating provided by the secondary valve member to thereby cut off the inlet port from the large area of the fluid pressure responsive member and to also exert force therethrough to move the secondary valve member and having a manually operable stem of a cross sectional area bearing the same ratio to the cross sectional area of the seating parts of the primary and secondary valve members as the smaller area of the fluid pressure responsive member bears to the larger area thereof.

4. In a device of the class described, a casing having a plurality of working spaces therein, an inlet port connected to a source of fluid pressure and communicating with one of said working spaces at all times, and an exhaust port adapted to communicate with another of said working spaces, a member responsive to fluid pressure having an area exposed to the inlet source and an opposite area exposed to the exhaust port, the area exposed to the exhaust port being greater, a primary valve member having diametrical unequal effective areas adapted to control the fluid pressure from the source to the working space to which the greater area of the pressure responsive member is exposed, a secondary valve member exposed to the pressures acting on the opposite areas of said pressure responsive member and adapted to exhaust the fluid pressure acting on the greater area of said pressure responsive means, and said primary valve member having the side with the greater effective area adjacent the working space to which the greater area of the pressure responsive member is exposed to thereby balance the fluid pressures acting on the diametrical areas of said valve when in closed position and to create an unbalance of pressures acting on said areas when the valve is in the open position, said unbalanced pressure acting in a direction to resist further opening of said valve.

5. In a device of the class described, a casing having a plurality of working spaces therein, an inlet port connected to a source of fluid pressure and communicating with one of said working spaces at all times, and an exhaust port adapted to communicate with another of said working spaces, a member responsive to fluid pressure having an area exposed to the inlet source and an opposite area exposed to the exhaust port, the area exposed to the exhaust port being greater, a primary valve member having diametrical unequal effective areas adapted to control the fluid pressure from the source to the working space to which the greater area of the pressure responsive member is exposed, a secondary valve member exposed to the pressure acting on the opposite areas of said pressure responsive member and adapted to exhaust the fluid pressure acting on the greater area of said pressure responsive means, said primary valve member having the side with the greater effective area adjacent the working space to which the greater area of the pressure responsive member is exposed to thereby balance the fluid pressures acting on the diametrical areas of said valve when in closed position and to create an unbalance of pressures acting on said areas when the valve is in the open position, said unbalanced pressure acting in a direction to resist further opening of said valve, and the secondary valve member having that area exposed to the pressure acting on the greater area of said pressure responsive member balanced against said pressure and that area exposed to the pressure acting on the lesser area of said pressure responsive means balanced against said pressure to thereby keep said secondary valve member in equilibrium.

6. In a device of the class described, a casing having a plurality of working spaces therein, an inlet port connected to a source of fluid pressure and communicating with one of said working spaces at all times, and an exhaust port adapted to communicate with another of said working spaces, a member responsive to fluid pressure having an area exposed to the inlet source and an opposite area exposed to the exhaust port, the area exposed to the exhaust port being greater, a primary valve member having diametrical unequal effective areas adapted to control the fluid pressure from the source to the working space to which the greater area of the pressure responsive member is exposed, a secondary valve member exposed to the pressure acting on the opposite areas of said pressure responsive member and adapted to exhaust the fluid pressure acting on the greater area of said pressure responsive means, and said primary valve member having the side with the greater effective area adjacent the working space to which the greater area of the pressure responsive member is exposed to thereby balance the fluid pressures acting on the diametrical areas of said valve when in closed position and to create an unbalance of pressures acting on said areas when the valve is in the open position, said unbalanced pressure acting in a direction to resist further opening of said valve, the secondary valve member having that area exposed to the pressure acting on the greater area of said pressure responsive member balanced against said pressure and that area exposed to the pressure acting on the lesser area of said pressure responsive means balanced against said pressure to thereby keep said secondary valve member in equilibrium, and manually operable means for actuating said primary valve member to move the same to open position.

7. In a device of the class described, a casing having a plurality of working spaces therein, an inlet port connected to a source of fluid pressure and communicating with one of said working spaces at all times, and an exhaust port adapted to communicate with another of said working spaces, a member responsive to fluid pressure having an area exposed to the inlet source and an opposite area exposed to the exhaust port, the area exposed to the exhaust port being greater, a primary valve member having diametrical unequal effective areas adapted to control the fluid pressure from the source to the working space to which the greater area of the pressure responsive member is exposed, a secondary valve member exposed to the pressures acting on the opposite areas of said pressure responsive member and adapted to exhaust the fluid pressure acting on the greater area of said pressure responsive means, said primary valve member having the side with the greater effective area adjacent the working space to which the greater area of the pressure responsive member is exposed to thereby balance the fluid pressures acting on the diametrical areas of said valve when in closed position and to create an unbalance of pressures acting on said areas when the valve is in the open position, said unbalanced pressure acting in a direction to resist further opening of said valve, and a manually operable member so connected to the primary and secondary valve members and to the pressure responsive member that movement of the pressure responsive member occasioned by manipulating the valve to vary a fluid pressure acting on the greater area of the pressure responsive member tend to return the primary valve member to its closed position.

JOHN KEITH SIMPSON.